IP8105 OR RE 27,973

35942:

United States Patent Office

Re. 27,973
Reissued Apr. 16, 1974

27,973
FILAMENT WINDING PROCESS

Donald W. Pennington, Lake Jackson, and Floyd E. Norton, Brazoria, Tex., assignors to The Dow Chemical Company, Midland, Mich.

No Drawing. Original No. 3,594,247, dated July 20, 1971, Ser. No. 679,194, Oct. 30, 1967. Application for reissue Aug. 28, 1972, Ser. No. 284,176
Int. Cl. B31c *3/00*
U.S. Cl. 156—175 8 Claims

Matter enclosed in heavy brackets [ ] appears in the original patent but forms no part of this reissue specification; matter printed in italics indicates the additions made by reissue.

ABSTRACT OF THE DISCLOSURE

Filament reinforced plastic pipe is made by an improved process which minimizes the loss of reactive, volatile monomers from the thermosettable resin composition during the cure cycle. The process consists of gelling the resin by subjecting the resin-filament layer to a temperature sufficient to gell the resin within 5 minutes and then curing the resin at the normal curing temperature.

This invention relates to an improved process for making filament reinforced plastic pipe, other elongate hollow articles and the like. More specifically it relates to an improved process wherein the curing of a resin impregnated, filament wound mandrel is accomplished in a two stage sequence comprising a rapid gel stage followed by a cure stage. The invention is advantageously used with thermosetting resins containing reactive, volatile monomers wherein the rapid gel stage minimizes loss of the reactive monomer during the cure stage.

Filament wound articles such as pipe, ducts, tubes, casings, storage vessels, etc. have been produced for a number of years using thermosetting resins. While a variety of techniques have evolved to prepare such articles, the process basically involves combining a thermosetting resin with a reinforcing filament wound around a mandrel and then curing to produce a hard, filament reinforced plastic article having the general shape of the mandrel.

However there is a particular problem in filament winding when thermosetting resins containing a reactive, volatile monomer are utilized. This problem concerns loss of the monomer from the resin composition during the curing cycle. If the resin is cured slowly, monomer is lost in substantial amounts by evaporation. If the resin is cured rapidly at a high temperature the monomer boils off before it can begin to react with the resin system.

A fast cure is desirable in order to obtain maximum production, but the resulting loss of monomer produces holes in the cured article and other changes in the ultimate cured properties. Frequently thermal stresses and cracking are caused by the exothermic reaction. What is needed is a process to overcome these problems and obtain the properties desired from the original formulation containing the reactive, volatile monomer.

Accordingly, the process of this invention makes possible these process improvements, as well as other advantages which will become apparent, by minimizing loss of the monomer during the curing cycle. The improved process of this invention comprises rapidly raising the temperature of the resin-filament wound mandrel to a predetermined elevated temperature sufficient to quickly gel the resin and after the gel is formed raising the temperature rapidly to a curing temperature. Rapid gelation maximizes retention of the monomer in the resin composition and imparts to the process the ability to cure thick laminates of up to one-half inch without cracking.

The process of this invention can advantageously use a rapid preheat stage prior to gellation wherein the resin-filament wound mandrel is first subjected for a short period of time to a source of heat at a temperature substantially above the gelation temperature and then heating the resin-filament wound mandrel to maintain it at about the gelation temperature. Following gelation the article is then cured as previously described.

Resins particularly suitable for use with this invention include the broad classes of thermosetting resins wherein a reactive, volatile monomer is admixed with the resin. Such monomer containing resin compositions are frequently desirable since the admixture of the monomer usually reduces the resin costs and provides a greater range of properties in the cured resin. By reactive is meant those monomers which contain a chemical grouping which react with the base resin, for example, the admixture of a polymerizable monomer such as styrene with an unsaturated polyester or an epoxy diluent with a polyepoxide resin.

Unsaturated polyesters represent one class of thermosetting resins suitable for use with this invention. Such resins are well known and are produced, generally, by reaction of a polyhydric alcohol with a polycarboxylic acid or its anhydride. When an unsaturated anhydride such as maleic anhydride is used an unsaturated polyester is produced which contains polymerizable double bonds. Curing by copolymerization of a reactive, volatile monomer such as styrene with the unsaturated polyester results in a three dimensional rigid network. In addition to styrene, a variety of ethylenically unsaturated monomers such as methyl methacrylate, vinyl toluene, α-methyl styrene, divinyl benzene, the halogenated styrenes, diallyl phthalate, triallyl cyanurate or mixtures of the above may be used. Additional monomers are also listed on page 30, Table II–1.7 in "Handbook of Reinforced Plastics," 1964, S. S. Oleesky and G. Mohr, Reinhold Publishing Corp., New York. The particular choice of monomer and the specific composition of the unsaturated polyester are dependent on the properties ultimately desired in the cured article and are known or readily determined by those skilled in the art. Additional valuable information useful in selecting the resin and monomer can also be found on pages 13–55 in the above reference.

Suitable, also, are the newer vinyl ester resins. These resins are generally prepared by reaction of an unsaturated carboxylic acid with a polyepoxide resin. The reaction of the polyepoxide with the carboxylic acid produces a thermosettable resin having terminal unsaturated groups which are polymerizable with monomers such as styrene. Such resins are described in more detail in the pending application of C. R. Bearden, Ser. No. 373,102, filed June 5, 1964, *and now U.S. 3,367,992* and in the application of D. H. Swisher and D. H. Garms, Ser. No. 597,233, filed on Nov. 28, 1966, *and now U.S. 3,564,074* and are incorporated into this application by reference. A wide variety of ethylenically unsaturated monomers, in addition to styrene, can be employed with the vinyl ester resins and are fully disclosed in the above applications.

Also included in the vinyl ester resins are those compositions wherein thickening agents, such as magnesium oxide, have been added. By reason of their rapid gelation at elevated temperatures vinyl ester resins constitute a preferred class.

Suitable thermosetting resins also include polyepoxide resins which may contain reactive monoepoxide diluents, such as butyl glycidyl ether. Generally, the polyepoxide resins include the glycidyl polyethers of polyhydric phenols, polyhydric alcohols, or phenol-aldehyde resins (the epoxy novolacs) as well as those resins where the epoxide group is introduced by epoxidation of a double bond in materials such as soy bean oil, polydienes, and the like. A further description of polyepoxide resins and reactive diluents can be found in such reference textbooks as the previously cited "Handbook of Reinforced Plastics," pp. 71–80, or "Epoxy Resins," H. Lee and K. Neville, 1957, McGraw-Hill Book Co., Inc., New York.

The particular temperature at which gelation occurs with these thermosetting resins is dependent on a number of factors such as the concentration of the reactive monomer in the resin composition, inhibitor, inhibitor level, catalyst and catalyst level, as well as the specific resin itself and the addition of other thickening agents such as magnesium oxide, and the like. All these factors are common to the use of the resins and familiar to those skilled in the art. Using available information and with a minimum of experimentation, formulations can be readily prepared which will gel rapidly at an elevated temperature.

By rapid gelation, within the scope of this invention, is meant gelation of the resin within about 5 minutes at an elevated temperature which is below the curing temperature. If the time for gelation is greater than about 5 minutes both excessive loss of monomer will occur as well as loss of resin by drainage from the mandrel. Generally a shorter time of the order of 20 seconds to 2 minutes is preferred to obtain a stiff gel which will retain composition on the mandrel and maximize containment of the monomer in the resin composition.

Tests useful in determining the gelation characteristics of a resin formulation include the common SPI Gel Time test as described in detail on pages 51–2 of the previously cited "Handbook of Reinforced Plastics" or the cure plate gel time described on page 22 of the same reference. A minor modification of the SPI Gel Test may be made wherein the liquid resins is continuously probed as the time is determined until a stiff gel is formed or wherein the temperature can be varied. The cure plate gel time is a rapid test consisting of merely dropping a sample of resin on a hot surface and determining the time for solidification to occur. These and other tests known to the art may be used to determine the gelation temperature.

The improved process of this invention is accomplished by first rapidly raising the temperature of the uncured resin-filament wound mandrel to the predetermined gelation temperature. A variety of heat sources may be utilized to accomplish this rapid changing of the temperature such as ovens, infra-red heating elements and the like. A preferred method of heating is to utilize a hollow mandrel and by suitable connecting means inject high temperature steam to internally heat the mandrel. Steam has the advantage of being able to rapidly change the temperature of the mandrel to the desired temperature, thereby zminimizing the induction time.

The induction time can be further reduced by a "preheat" cycle wherein the mandrel is first internally heated by injecting steam at a temperature substantially above the gelation temperature for a short period of time followed immediately by steam at a temperature sufficient to maintain the mandrel at the gelation temperature.

Following gelation of the resin the temperature is then rapidly raised to a curing temperature. The curing temperature will vary with the resin and the particular formulation but is generally known or can be readily determined.

With certain articles such as corrosion resistant pipe, vessels, etc. it is generally desirable to first prepare a liner comprised of the resin only or a glass mat reinforced resin liner. This can be accomplished by applying the resin or a resin impregnated glass mat to the mandrel by any of a variety of suitable means and then utilizing the process of this invention to gel the resin at an elevated temperature and cure at a higher temperature. Following the preparation of the liner it can then be reinforced by winding filaments around the liner, impregnating with resin and then gelling and curing by the process of this invention. The liner of course can be made from other materials and by other techniques such as extrusion.

The following non-limiting examples illustrate the improved process of this invention. All of the examples utilized the following general fabrication method although the invention is not limited thereto. A ten foot hollow mandrel, 2 inch O.D., was positioned for rotation in a supporting frame. By suitable, conventional means, a plurality of continuous glass filaments were passed through a resin bath and wound around the rotating mandrel. Following winding, the mandrel was advanced to a second position where the mandrel was connected by suitable means at each end of a source of steam. At the second position steam was injected into the hollow mandrel to raise the temperature from the ambient temperature to the gelation temperature. Following gelation the temperature was rapidly increased by increasing the steam pressure to complete the cure. After the resin was cured the mandrel was removed and the reinforced plastic pipe was removed from the mandrel. The cure station was adapted so that steam of three different temperatures could be injected so as to utilize the "pre-heat" operation previously described before the gelation stage. Obviously the above operation could be performed from only a single station or position, if desired. The number of positions or mechanical sequence depends on the equipment available but is not critical to the invention, itself.

EXAMPLE 1

Vinyl ester resin

Glass fiber reinforced pipe was made using a vinyl ester but the pipe was cured in several different ways to illustrate the process of this invention. The vinyl ester resin was prepared by first reacting about one mole of maleic anhydride with about one mole of β-hydroxyethyl acrylate to form a maleate half ester. The half ester was then reacted with a polyepoxide resin prepared from bisphenol A having an epoxide equivalent weight of about 172–178. The reactants were combined in about a 1:1 equivalents ratio of epoxide to carboxylic acid. The resin was then diluted with styrene to a final concentration of about 40 weight percent styrene and 60 weight percent resin. The resin was formulated to contain about 1 weight percent of catalyst.

The styrene diluted resin was found to gel rapidly at about 200–225° F. and was found to cure at about 300° F.

(A) Fast cure at one temperature only (prior art).—Using the above vinyl ester resin a 2" I.D. fiberglass reinforced pipe was made wherein the resin was cured by heating the mandrel internally with 300° F. steam for about 1.5 minutes. The resulting product had excessive bubbling at the surface and surface cracking.

(B) Slow cure at one temperature only (prior art).—In a manner similar to A, a 2" I.D. pipe was fabricated wherein the resin was cured by internally heating the mandrel with 250° F. steam for about 5 minutes. Again the resulting product had excessive bubbling at the surface and surface cracking.

(C) Cure by the process of this invention.—A 2" I.D. pipe was fabricated according to this invention by the method previously described. After winding, the mandrel was moved to the second position and heated by 212–215° F. steam for 4 minutes to form a stiff gel. The temperature was quickly raised by increasing the steam pressure and a temperature of 300° F. was maintained for 2 minutes. The pipe produced was of good quality with no cracks or bubbles and there was no excessive drainage of the resin during fabrication.

(D) Cure by the process of this invention.—In a manner similar to that of C, a 2" I.D. pipe was fabricated wherein the mandrel at the second station was first preheated for 10 seconds with 285° F. steam followed by 235° F. steam for 2½ minutes to form a gel. The temperature was then raised to 300° F. for 1¼ minutes by increasing the steam pressure. The pipe was produced in less time than that required for C because of the preheat treatment and the pipe had a good surface free from cracks and bubbles. The process of fabrication was also free of excessive drainage.

EXAMPLE 2

Corrosion resistant pipe

A resin liner was prepared by applying to the mandrel a commercially available hydrogenated bisphenol polyester (Atlac 382) diluted to 50 percent by weight with styrene. The resin contained about 1 weight percent of a catalyst and was found to gel rapidly at about 235° F.

After the mandrel was coated, it was heated for 10 seconds with 300° F. steam (preheat) followed by gelation of the resin by heating for 60 seconds with 235° F. steam. After gelation the resin was cured by heating for 60 seconds with 285° F. steam.

The resin liner, so produced, can then be utilized to prepare a filament reinforced pipe by applying a thermosetting resin to the liner, reinforcing by winding a filamentary material around the liner and using the improved process of this invention, as described in Example 1, to cure the pipe.

The above examples illustrate the utility of quickly gelling the resin first followed by curing at a higher temperature. It is to be understood that other additives may be present in the resin formulation such as inert fillers, gelling agents, thickening agents, stabilizers, flame retardants and the like. The catalyst and catalyst levels are well known for each of the thermosetting resins. The particular time cycle for any one resin formulation will depend on the nature and amount of these additives as well as those factors previously described such as monomer level, catalyst, inhibitor level, and the like.

What is claimed is:

1. In a process for fabricating filament reinforced plastic articles wherein a thermosetting resin containing a reactive, volatile monomer is combined with reinforcing filaments wound around a mandrel and wherein the resin is cured to form a hard filament reinforced article having the general shape of the mandrel, an improved temperature controlled process which comprises *forming a resin-filament layer around a mandrel maintained at about ambient temperature,* rapidly raising the temperature of the resin-filament layer to a predetermined elevated gelation temperature sufficient to gel the resin within about 5 minutes without excessive loss of monomer and holding said layer at about said gelation temperature until gelled and [then,] *directly thereafter* curing the resin by rapidly raising the temperature to a resin curing temperature, *wherein said temperature control is obtained by internally heating the mandrel.*

2. The process of claim 1 wherein the resin-filament layer is gelled by first subjecting the resin-filament layer for a short period of time to a source of heat substantially above the predetermined gelation temperature followed by subjecting the resin-filament layer to a source of heat to maintain it at about the gelation temperature.

3. The process of claim 1 wherein the mandrel is internally heated by high temperature steam.

4. The process of claim 1 wherein the thermosetting resin is an unsaturated polyester resin containing an ethylenically unsaturated monomer.

5. The process of claim 1 wherein the thermosetting resin is a vinyl ester resin containing an ethylenically unsaturated monomer.

6. The process of claim 1 wherein the thermosetting resin is an epoxy resin containing a volatile monoepoxy diluent.

7. The process of claim 1 wherein said mandrel is disposed within a resin liner for the reinforced plastic article.

8. The process of claim 7 wherein said liner is prepared by applying the resin to the mandrel, gelling the resin by rapidly raising the temperature to a predetermined elevated gelation temperature sufficient to gel the resin within about 5 minutes and holding thereat until gelled and then curing the resin by rapidly raising the temperature to a resin curing temperature.

References Cited

The following references, cited by the Examiner, are of record in the patented file of this patent or the original patent.

UNITED STATES PATENTS

| | | | |
|---|---|---|---|
| 3,341,387 | 9/1967 | Boggs | 156—175 |
| 3,156,598 | 10/1964 | Martin | 156—175 |
| 2,614,058 | 10/1952 | Francis | 156—175 |
| 2,843,153 | 7/1958 | Young | 156—175 |
| 3,154,107 | 10/1964 | Vanderbilt | 156—175 |
| 3,207,641 | 9/1965 | Small et al. | 156—175 |
| 3,072,518 | 1/1963 | White | 156—175 |
| 3,236,711 | 4/1961 | Adler | 156—175 |

FOREIGN PATENTS 1,181,368 1/1959 France.

OTHER REFERENCES

Oleesky et al., "Handbook of Reinforced Plastics," 1964, pp. 36, 37.

DANIEL J. FRITSCH, Primary Examiner

U.S. Cl. X.R.

156—169, 172, 173